(12) United States Patent
Zhuang

(10) Patent No.: US 7,761,880 B2
(45) Date of Patent: Jul. 20, 2010

(54) DYNAMICALLY EXTENDING XML-BASED SERVICE THROUGH CLIENT

(75) Inventor: Yi Zhuang, Markham (CA)

(73) Assignee: International Business Machines Corporation, Armonk, NY (US)

( * ) Notice: Subject to any disclaimer, the term of this patent is extended or adjusted under 35 U.S.C. 154(b) by 966 days.

(21) Appl. No.: 11/535,533

(22) Filed: Sep. 27, 2006

(65) Prior Publication Data

US 2008/0077709 A1 Mar. 27, 2008

(51) Int. Cl.
*G06F 9/46* (2006.01)
*G06F 17/30* (2006.01)
(52) U.S. Cl. .......................................... 719/316; 707/5
(58) Field of Classification Search .................. 719/316
See application file for complete search history.

(56) References Cited

U.S. PATENT DOCUMENTS

2002/0156872 A1* 10/2002 Brown ......................... 709/219
2006/0123010 A1* 6/2006 Landry et al. .................. 707/10
2006/0156277 A1* 7/2006 Gupta et al. ................. 717/104

OTHER PUBLICATIONS

Kevin Williams et al., An Introduction to Service Data Objects Integrating relational data into Web applications, [online] [retrieved on Sep. 7, 2006] from the internet http;//java.sys-con.com/read/ . . . .

Frank Budinsky et al., Introduction to Services Data Objects Next-generation data programming in the Java environment, [online] [retrieved on Sep. 7, 2006] from the internet http://www-128.ibm.com/developerworks/java/library/j-sdo/.

Graham Charters et al., An introduction to service data objects for PHP, [online] [retrieved on Sep. 7, 2006] from the internet http://devzone.zend.com/node/view/id/757.

* cited by examiner

*Primary Examiner*—Hyung S Sough
*Assistant Examiner*—Abdou K Seye
(74) *Attorney, Agent, or Firm*—Cantor Colburn LLP; Andre Gibbs

(57) ABSTRACT

A method for dynamically extending a remote service by client at runtime including: creating a Service Data Object (SDO)-based local service instance by locating a remote service; retrieving latest schema from the remote service in a first format; SDO-based remote service converting the schema to a second format; allowing the SDO-based local service to obtain the second format from the remote service; restoring the schema from the second format to the first format in the SDO-based local service; registering the second format into local Java Virtual Machine (JVM) of the SDO-based local service; and permitting a client to use the latest schema of the remote service via the SDO-based local service.

4 Claims, 2 Drawing Sheets

DYNAMICALLY EXTENDING XML-BASED SERVICE THROUGH CLIENT

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates generally to dynamically extending XML-based remote service by clients and particularly to extending Service Data Objects (SDO)-based remote service from client.

2. Description of Background

XML-based service use Extensible Markup Language (XML) to describe the data passed in and out from the interface. The structure of the XML is defined by XML Schema Definition (XSD). For example, SDO-based services use service data objects as their input and output parameters. The structure of the data service object is defined by XSD.

SDO is a data programming specification that complements existing Java 2 Enterprise Edition (J2EE) technologies and enables service-oriented architectures by providing uniform data access for a wide variety of service and resource types. Not only does SDO enable a consistent approach to data access, but it also provides features that simplify common application tasks, such as allowing data browsing and updating while the application is disconnected from the data source. SDOs are designed to simplify and unify the way applications handle data. By using SDOs, application programmers can uniformly access and manipulate data from heterogeneous data sources, including relational databases, XML data sources, Web services, and other such enterprise information systems. Since SDO provides a single data access API (Application Program Interface), developers can choose the framework that best fits an application without learning to use different APIs for every application.

Eclipse Modeling Framework (EMF) is based on a data model defined using Java interfaces, XML Schema, or UML class diagrams, EMF will generate a unifying meta model (called Ecore) which in conjunction with the framework can be used to create a high-quality implementation of the model. IBM's reference implantation of SDO is based on EMF. In this implementation, the XSD needs to load into memory and registered in the Java Virtual Machine (JVM) as Ecore model before the SDO can be created. Ecore model is represented in Java as schema packages (org.eclipse.emf.ecore.EPackage).

The behavior and capability of XML-based service can be extended by extending the interface schema. There are applications which require the schema to be extended by clients dynamically. "Remote" means the client and the service are running in different JVMs. "Dynamically" means the service does not need to restart to support the extension. For SDO-based remote service, this means once the schema (Ecore model) is extended, it needs to re-register the schema on both client and server side.

There a several challenges to achieve this. First, the Ecore model needs to be transferred from server to clients. But Ecore model (schema packages) is not serializable. In other words, the schema packages cannot be directly transferred between two JVMs remotely. A second challenge is that every client has to retrieve the schema packages and register the schema packages before calling the server and needs to do this every time the schema packages on server change. This increases the complexity of the client application, making SDO-based remote service difficult to use.

Considering the limitations of the aforementioned methods, it is clear that there is a need for an efficient method for clients to extend SDO-based remote service dynamically.

SUMMARY OF THE INVENTION

The difficulties are overcome and additional advantages are provided through the provision of a system for dynamically extending remote service interface by clients. The system comprising: a SDO-based local service and the client; a SDO-based remote service and the server where the remote service is running. The local service provides the functions for locating remote service, retrieving schema packages and register schema. The remote service provides the function for getting schema, allowing extending schema and support extended schema dynamically.

The difficulties are overcome and additional advantages are provided through the provision of a method for dynamically extending SDO-based remote service by client though SDO-based local service. The method comprising the following. Create a SDO-based local service in client's JVM. It has the same interface as the remote service interface. Client calls this local service instead of remote service. Local service locates remote service and sends request for retrieving Ecore model. The remote service will convert the Ecore model from schema packages to a serializable format and send back to local service. Local service restores the serializable format to schema packages and register in the client's JVM.

Additional features and advantages are realized through the techniques of the present invention. Other embodiments and aspects of the invention are described in detail herein and are considered a part of the claimed invention. For a better understanding of the invention with advantages and features, refer to the description and the drawings.

TECHNICAL EFFECTS

As a result of the summarized invention, technically we have achieved a solution that provides for an efficient method for dynamically extending SDO-based remote service through clients.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

One aspect of the exemplary embodiments is a method for client to retrieve schema from SDO-based remote service. In another aspect of the exemplary embodiments, a remote service interface is dynamically changed at runtime, by a client, by extending the schema of the data object to include more attributes. In yet another exemplary embodiment, the remote service's business logic is able to interpret new schema and support the new attributes without restart the server.

SDO-based local service is a proxy of the SDO-based remote service at the local JVM (Java Virtual Machine) of clients. The SDO-based local service implements the SDO-based remote service so that client applications can use it the same way as the SDO-based remote service. The implementation of the local service solves the problem of transferring schema remotely by converting them to serializable form of byte arrays. In addition, the implementation hides the complexity of looking up remote service, and retrieving and registering schema from the clients. As a result, by using an SDO-based local service, the exemplary embodiments of the present invention allow clients to dynamically extend the interface of remote service remotely at runtime. The schema used may be extended to support additional syntaxes, matching rules, attribute types, and object classes. For example, following is a sample method of SDO-based EJB service, which allows a client to create a "Person." For instance:

```
create(Person person)
"Person" is a service data object. The attributes of the "Person" type is
defined in XML schema. According to the schema, "Person" type contains
only "givenName" and "FamilyName" two attributes:
   <xsd:complexType name="Person">
   <xsd:complexContent>
       <xsd:element name="givenName" type="xsd:string"/>
       <xsd:element name="familyName" type="xsd:string"/>
   </xsd:complexContent>
</xsd:complexType>
```

Assume a client wishes to create a new type called "Employee," which extends from "Person" type with one additional attribute called "EmployeeNumber." The client may also desire to perform this operation dynamically at runtime, which means the service cannot be stopped and restarted. The new XML schema will look like this:

```
   <xsd:complexType name="Employee">
   <xsd:complexContent>
       <xsd:extension base="Person">
       <xsd:sequence>
       <xsd:element name="EmployNumber" type="xsd:string
   </xsd:complexContent>
   </xsd:complexType>
```

For the SDO-based remote service, which allows clients to dynamically extend its interface, two support methods may be desired. These support methods are: (1) "getSchema", which allows clients to retrieve latest schema from service, and (2) "addSchema", which allows clients to extend service interface by adding new schema. Besides these two methods, a method "create" is provided to allow client to create a new "Person" or "Employee".

Figure 1:
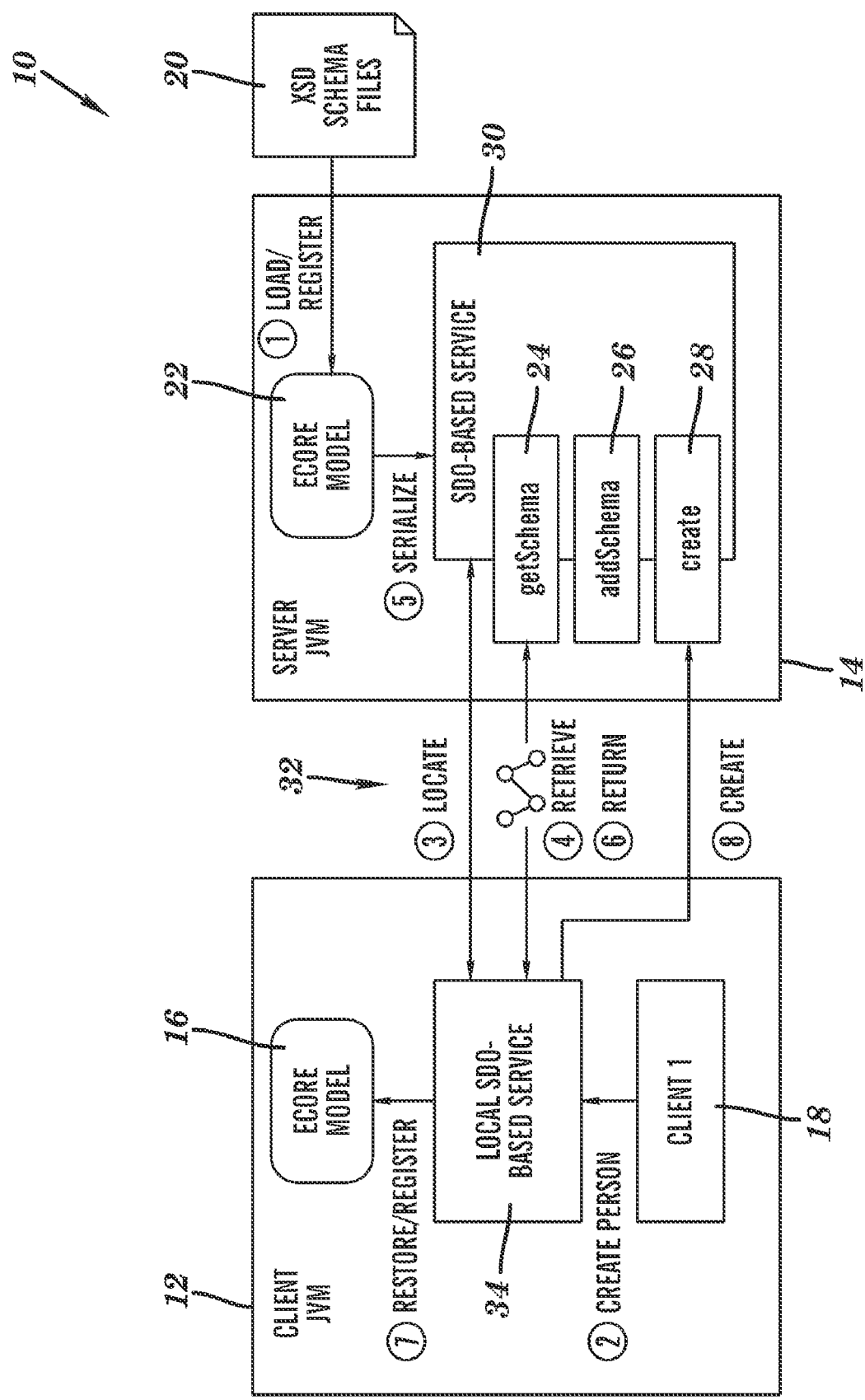
FIG. 1 illustrates one example of a block diagram describing the initialization process for a SDO-based remote service and local service when a client calls the local service for the first time.

Referring to FIG. 1, one example of a block diagram describing an initialization process 10 for a SDO-based remote service and local service is illustrated. The initialization process 10 includes the following system components: a client JVM 12 in communication with a server JVM 14. The client JVM 12 includes Ecore model 16, client 118 and SDO-based local service 34. The server JVM 14 includes Ecore model 22 and SDO-based remote service 30. The method "getSchema" 24, the method "addSchema" 26, and the method "create" 28 are included in a SDO-based remote service 30. XSD Schema Files 20 is located on server. The SDO-based local service 34 is in communication with SDO-based remote service 30 via communication link 32, which includes locate, retrieves/return and create.

The communication of the SDO-based local service 34 with the SDO-based remote service 30 can be summarized as follows. (1) During the start process of SDO-based remote service 30, it loads the schema from XSD schema files 20 and registers the schema as Ecore model 22 in the Server JVM 14. (2) Client 118 calls SDO-based local service 34 to create a "Person". (3) Since this is the first time SDO-based local service 34 being called, it needs to locate the SDO-based remote service 30. (4) After the service is located, SDO-based local service 34 calls method "getSchema" 24 to request the schema from the SDO-based remote service 30. (5) The service serializes the Ecore model 22 in server JVM 14 to byte array. (6) The serialized schema is then returned back to the SDO-based local service 34. (7) After receiving the byte array form of the schema, the SDO-based local service 34 restores it back to Ecore model 16 and register it in client JVM 12. (8) Finally, the SDO-based local service 34 continue the call from the client 118 by calling method "create" 28 of SDO-based remote service 30. This method will create new "Person" on the server.

Figure 2:
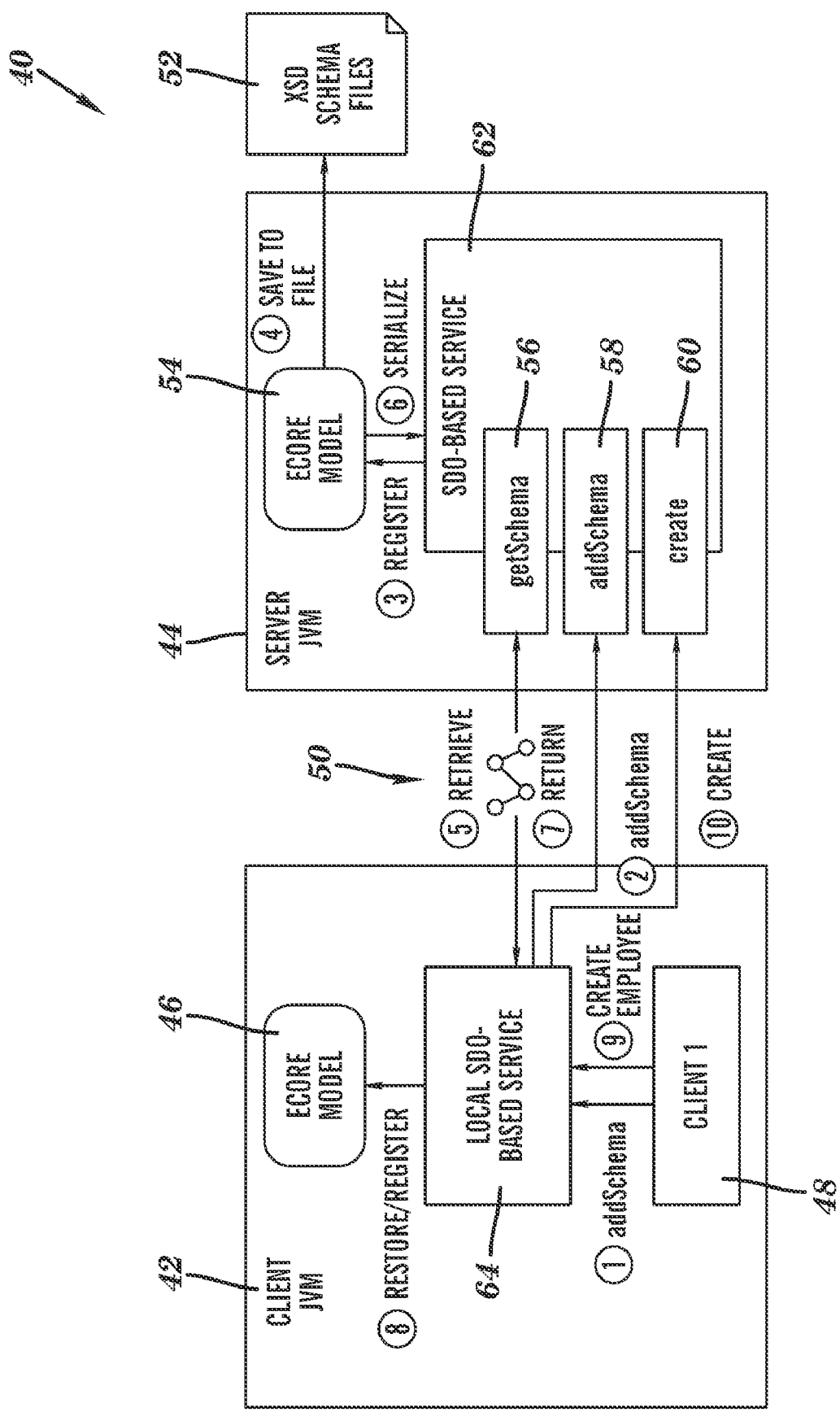
FIG. 2 illustrates one example of a block diagram describing how the client extends the SDO-based remote service through the local service and use the extended service.

Referring to FIG. 2, one example of a block diagram describing an extension process 40 for a client to dynamically extend the SDO-based remote service interface though the help of the SDO-based local service is illustrated. The extension process 40 includes the following system components: a client JVM 42 in communication with a server JVM 44. The client JVM 42 includes Ecore model 46, client 148 and SDO-based local service 64. The server JVM 44 includes Ecore model 54 and SDO-based remote service 62. The method "getSchema" 56, the method "addSchema" 58, and the method "create" 60 are included in a SDO-based remote service 62. XSD Schema Files 52 is located on server. The SDO-based local service 64 is in communication with SDO-based remote service 62 via retrieves/return, addSchema and create with communication link 50.

Specifically, the communication of the SDO-based local service 64 with the SDO-based remote service 62 can be summarized as follows. (1) The client calls the method "addSchema" of SDO-based local service 64 to add a new type called "Employee," which has a new attribute called "EmployeeNumber." (2) SDO-based local service 64 passes the call to SDO-based remote service 62. (3) SDO-based remote service 62 validates the new schema to make sure that the request does not change the existing schema, only add new schema to existing schema. After validation, SDO-based remote service 62 merges the added schema with existing schema and registers the new schema as Ecore model 54 in the Server JVM 44. (4) The SDO-based remote service 62 saves the schema back to schema files so that the new schema is still there when service restarts. The server business logic should be able to interpret the new schema and change its internal configuration to support this new type "Employee". (5) SDO-based local service 64 calls method "getSchema" 56 to request the new schema from the SDO-based remote service 62. (6) The service serializes the Ecore model 54 in server JVM 44 to byte array. (7) The serialized schema is then returned back to the SDO-based local service 64. (8) After receiving the byte array form of the schema, the SDO-based local service 64 restores it back to Ecore model 46 and register it in client JVM 42. (9) The client 148 can now call the method "create" to create the new type "Employee" with new attribute "EmployeeNumber." (10) SDO-based local service

64 passes the call to SDO-based remote service 62 to finish the call to create the new type "Employee".

In the implementation of the algorithm, the SDO-based local service help clients to do the entire schema related tasks. This can relieve clients from the above work and concentrate on business functions, thus effectively using resources.

Since the new schema extends, not changes the existing schema, the new schema should not affect other clients. If another client attempts to extend the service interface with new schema that conflicts with the new schema created by a first client (e.g., creating a new type which also named "Employee" in the same name space), then the service makes an exception to this request. Specifically, the client calls method "getSchema" to retrieve the latest schema from service and use the "Employee" type created by the first schema. The client can also try to create the type again with different name or different name space.

Following are some sample code of the implementation for the process in FIG. 1 and FIG. 2:

When a client needs to access SDO-based remote service, it creates an SDO-based local service instance first. In the following example, the remote server is implemented as EJB interface. "LocalServiceProvider" is the SDO-based local service. An instance of "LocalServiceProvider" is created with the host name of the remote EJB server and the RMI (Remote Method Invocation) port. Specifically:

```
// Client application creates a SDO-based local service instance.
   com.ibm.websphere.wim.Service service = new
   LocalServiceProvider("localhost", 2809);
```

During the initialization of the SDO-based local service instance, it looks up the remote service, and then retrieves the schema packages from the service. For example, the getSchema method of the remote service converts the Ecore model from "EPackage" to byte arrays. The following exemplary code illustrates a method of performing such task:

```
// Creates ResourceSet
   org.eclipse.emf.ecore.resource.Resource.Factory.Registry.INSTANCE.-
   getExtensionTo
   FactoryMap( ).put("ecore", new EcoreResourceFactoryImpl( ));
   org.eclipse.emf.ecore.resource.ResourceSet rs = new
   org.eclipse.emf.ecore.resource.impl.ResourceSetImpl( );
   org.eclipse.emf.ecore.resource.Resource r =
rs.createResource(URI.createURI(".ecore"));
   // Adds all related EPakcages
   org.eclipse.emf.ecore.EPackage ePackage
   =EPackage.Registry.INSTANCE.getEPackage(nsURI);
   r.getContents( ).add(ePackage);
   // Converts to bypte array
   java.io.ByteArrayOutputStream outputstream = new
java.ioByteArrayOutputStream(2064);
   r.save(outputstream, Collections.EMPTY_MAP);
   return outputstream.toByteArray( );
```

After the SDO-based local service instance obtains the byte arrays from SDO-based remote service, it restores the schema packages from byte arrays back to "EPackage", and registers them in a local VJM as Ecore model:

```
// Retrieves byte array form of schema packages from remote service
bypte[ ] schemabytes = service.getSchema(null);
// Converts byte array to EPackage
```

-continued

```
Resource.Factory.Registry.INSTANCE.getExtensionToFactoryMap( ).-
put("ecore",
new EcoreResourceFactoryImpl( ));
ByteArrayInputStream is = new ByteArrayInputStream(schemabytes);
ResourceSet rs = new ResourceSetImpl( );
Resource cr = rs.createResource(URI.createURI(".ecore"));
cr.load(is, Collections.EMPTY_MAP);
// Registers EPackage in local JVM.
List packages = cr.getContents( );
for (int i = 0; i < packages.size( ); i++)
{
    EPackage thisPackage = (EPackage)cr.getContents( ).get(i);
    String packageURI = thisPackage.getNsURI( );
    thisPackage.setEFactoryInstance(new
    DynamicEDataObjectImpl.FactoryImpl( ));
    EPackage.Registry.INSTANCE.put(packageURI, thisPackage);
}
```

All the above steps are transparent to the client. They are part of the initialization process of the SDO-based local service. After the client creates this new instance of SDO-based local service, the client can then access the remote service through this local service. For example:

```
// Client application creates a SDO-based local service instance.
   com.ibm.websphere.wim.Service service = new
   LocalServiceProvider("localhost", 2809);
   // Client application call create API to creates a new entry.
   service.create(inputDataObject)
```

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for dynamically extending a remote service interface by a client at runtime, the method comprising:
    allowing the client to call an addSchema method of a local service to add a new schema;
    allowing the local service to pass the call to the remote service;
    validating the new schema via the remote service to ascertain that a request does not change existing schema, only add the new schema to the existing schema;
    merging the added new schema with the existing schema via the remote service;

registering the new schema in a server Java Virtual Machine (JVM);

saving the new schema back to schema files via the remote service;

interpreting and supporting the new schema;

calling a getSchema method via the local service to request the new schema from the remote service;

converting the new schema from a first format to a second format via the remote service;

allowing the local service to obtain the second format from the remote service;

restoring the new schema from the second format to the first format via the local service;

registering via the local service the first format in a local JVM of the local service; and allowing the client to call a create method with the new schema, wherein the getSchema method and the addSchema method are used in the remote service, the getSchema method allowing the client to retrieve latest schema from the remote service and the addSchema method allowing the client to extend the remote service by adding new schema.

2. The method of claim 1, wherein the first format is an Ecore model.

3. The method of claim 1, wherein the second format is a byte array.

4. The method of claim 1, wherein another support method is the create method, which allows the client to create an object type in the existing schema and the new schema.

* * * * *